US011157981B2

(12) United States Patent
Agrawal et al.

(10) Patent No.: US 11,157,981 B2
(45) Date of Patent: Oct. 26, 2021

(54) METHOD, COMPUTER PROGRAM PRODUCT AND SYSTEM FOR BIDDING ON MULTI-MODAL SUB-SPACES FOR E-COMMERCE SEARCHES

(71) Applicant: International Business Machines Corporation, Armonk, NY (US)

(72) Inventors: Priyanka Agrawal, Bangalore (IN);
Ayushi Dalmia, New Delhi (IN);
Jaikrishnan Hari, Bangalore (IN);
Sachindra Joshi, New Delhi (IN);
Vikas C. Raykar, Bangalore (IN);
Raghavendra Singh, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 15/954,925

(22) Filed: Apr. 17, 2018

(65) Prior Publication Data
US 2019/0318406 A1 Oct. 17, 2019

(51) Int. Cl.
*G06Q 30/06* (2012.01)
*G06F 16/50* (2019.01)
(Continued)

(52) U.S. Cl.
CPC ....... *G06Q 30/0625* (2013.01); *G06F 16/334* (2019.01); *G06F 16/50* (2019.01); *G06F 16/90335* (2019.01)

(58) Field of Classification Search
None
See application file for complete search history.

(56) References Cited

U.S. PATENT DOCUMENTS

2006/0242017 A1    10/2006  Libes et al.
2007/0100650 A1*    5/2007  Ramer ............... G06F 16/9535
                                              705/26.1
(Continued)

OTHER PUBLICATIONS

Shopping.com(TM) launches new smart bidding system. (Dec. 9, 2003). PR Newswire Retrieved from https://dialog.proquest.com/professional/docview/451810435?accountid=161862 (Year: 2003).*

(Continued)

*Primary Examiner* — Allison G Wood
*Assistant Examiner* — Ashley D Preston
(74) *Attorney, Agent, or Firm* — Ryan, Mason & Lewis, LLP (57) ABSTRACT

Methods, systems, and computer program products in connection with a system for bidding on multi-modal sub-spaces for e-commerce searches is provided herein. A computer-implemented method includes representing, in an embedding space affiliated with at least one electronic commerce website: (i) images related to one or more bids and (ii) items of text related to the one or more bids, the images and the items of text both coming from one or more bidding entities. Such a method also includes mapping a query to the embedding space based on a comparison of features of the query to (i) the images and (ii) the items of text. Further, such a method additionally includes selecting at least one of the one or more bidding entities based on the mapping, and outputting, to at least one user in response to the query, search results associated with the at least one selected bidding entity.

13 Claims, 7 Drawing Sheets

(51) Int. Cl.
  *G06F 16/33* (2019.01)
  *G06F 16/903* (2019.01)

(56) References Cited

U.S. PATENT DOCUMENTS

| | | | |
|---|---|---|---|
| 2008/0082426 A1* | 4/2008 | Gokturk | G06Q 30/0625 |
| | | | 705/26.62 |
| 2009/0265622 A1* | 10/2009 | Hickman | G06Q 30/02 |
| | | | 715/273 |
| 2012/0166293 A1 | 6/2012 | Jing et al. | |
| 2015/0178786 A1 | 6/2015 | Claessens | |
| 2015/0302470 A1 | 10/2015 | Dru et al. | |
| 2015/0317678 A1 | 11/2015 | Huang et al. | |
| 2018/0356949 A1* | 12/2018 | Wang | G06F 3/0484 |

OTHER PUBLICATIONS

Mehra, G., "Visual Search for Ecommerce Going Mainstream," Practical Ecommerce, http://www.practicalecommerce.com/articles/129761-Visual-Search-for-Ecommerce-Going-Mainstream, Nov. 8, 2016.

* cited by examiner

METHOD, COMPUTER PROGRAM PRODUCT AND SYSTEM FOR BIDDING ON MULTI-MODAL SUB-SPACES FOR E-COMMERCE SEARCHES

FIELD

The present application generally relates to information technology, and, more particularly, to electronic commerce (e-commerce) management.

BACKGROUND

There has been a significant increase in digital data generation in recent years, particularly with respect to visual content such as photos and videos. Such digital data proliferation has led to an increase in the implementation and use of multi-modal systems. With the increase of multi-model systems, a growing number of e-commerce websites attempt to facilitate user interaction in various modes such as via text and images. Additionally, in conjunction with such e-commerce websites, conventional bidding systems allow advertisers to bid on textual keywords or specific item images. Such conventional bidding systems accordingly constrain the types of queries on which e-commerce websites can bid, and as a result, the resulting advertisements for a user query can return unrelated results and thus fewer clicks and/or page views.

SUMMARY

In one embodiment of the present invention, a system for bidding on multi-modal sub-spaces for e-commerce searches is provided. An exemplary computer-implemented method can include includes representing, in an embedding space affiliated with at least one electronic commerce website: (i) one or more images related to one or more bids and (ii) one or more items of text related to the one or more bids, the one or more images and the one or more items of text both coming from one or more bidding entities. Such a method also includes mapping a query to the embedding space based on a comparison of one or more features of the query to (i) the one or more images and (ii) the one or more items of text. Further, such a method additionally includes selecting at least one of the one or more bidding entities based on the mapping, and outputting, to at least one user in response to the query, search results associated with the at least one selected bidding entity.

In another embodiment of the invention, an exemplary computer-implemented method can include generating an embedding space associated with at least one electronic commerce website, wherein the embedding space comprises multiple sub-spaces associated with multiple types of commercial offerings of the at least one electronic commerce website, and displaying the multiple sub-spaces via a user interface. Such a method can also include processing one or more bids, submitted by one or more bidding entities, for coupling one or more offerings to one or more of the multiple sub-spaces, wherein processing comprises processing one or more interactions between the one or more bidding entities and the user interface. Further, such a method can additionally include assigning one or more offerings from one or more of the bidding entities to one or more of the multiple sub-spaces based on the processing, and outputting, to at least one user in response to a query associated with a given one of the multiple types of commercial offerings of the at least one electronic commerce website, search results associated with the bidding entity assigned to the sub-space associated with the given type of commercial offering.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes a system for bidding on multi-modal sub-spaces for e-commerce searches. Such an embodiment includes representing the text and images of an entire product catalog (or portions thereof) in a high-dimensional space, and the above-noted sub-spaces are parts/portions of this high-dimensional space.

By way of example, at least one embodiment of the invention includes enabling bidding on multi-modal abstract sub-spaces for advertisement(s) on one or more e-commerce catalogues by creating an embedding space open to embedding, for representing bid images from one or more advertisers and/or one or more bidders in the embedding space in response to an image and/or text query. Such an embodiment can include representing bid images from advertisers and/or bidders in the embedding space by mapping the query text and/or image to the embedding space and selecting the most suitable advertiser. The candidates for a "suitable" advertiser can include, for example, those advertisers associated with a bid space having the closest match to the user query and yielding the maximum bid price. Additionally, at least one embodiment of the invention can also include displaying, to a user, target search results associated with the selected advertiser.

Also, one or more embodiments of the invention include associating selected sub-spaces with bid prices and/or values, and enabling users to bid on a sub-space by selecting a region from an interactive user interface (UI). Accordingly, in such an embodiment, the high-dimensional space of text and images is open for bidding by sellers, and sellers can bid on one or more particular sub-spaces by specifying a bid price for each such sub-space.

Accordingly, and as further detailed herein, at least one embodiment of the invention can include image and textual bidding for multi-modal search results for e-commerce websites. By way of illustration, consider an example use case wherein search results display the first page of e-commerce websites, which thereby renders such first pages as having a higher probability of generating maximum conversion into purchase (than do the other pages of the e-commerce web sites). The limited real-estate of the first page of the e-commerce web sites can therefore allow for a revenue generation model for the e-commerce enterprises and/or retailers, as the e-commerce enterprises and/or retailers can allow sellers and/or advertisers to bid for one or more portions of space on the first page for one or more text and/or image queries.

Figure 1:
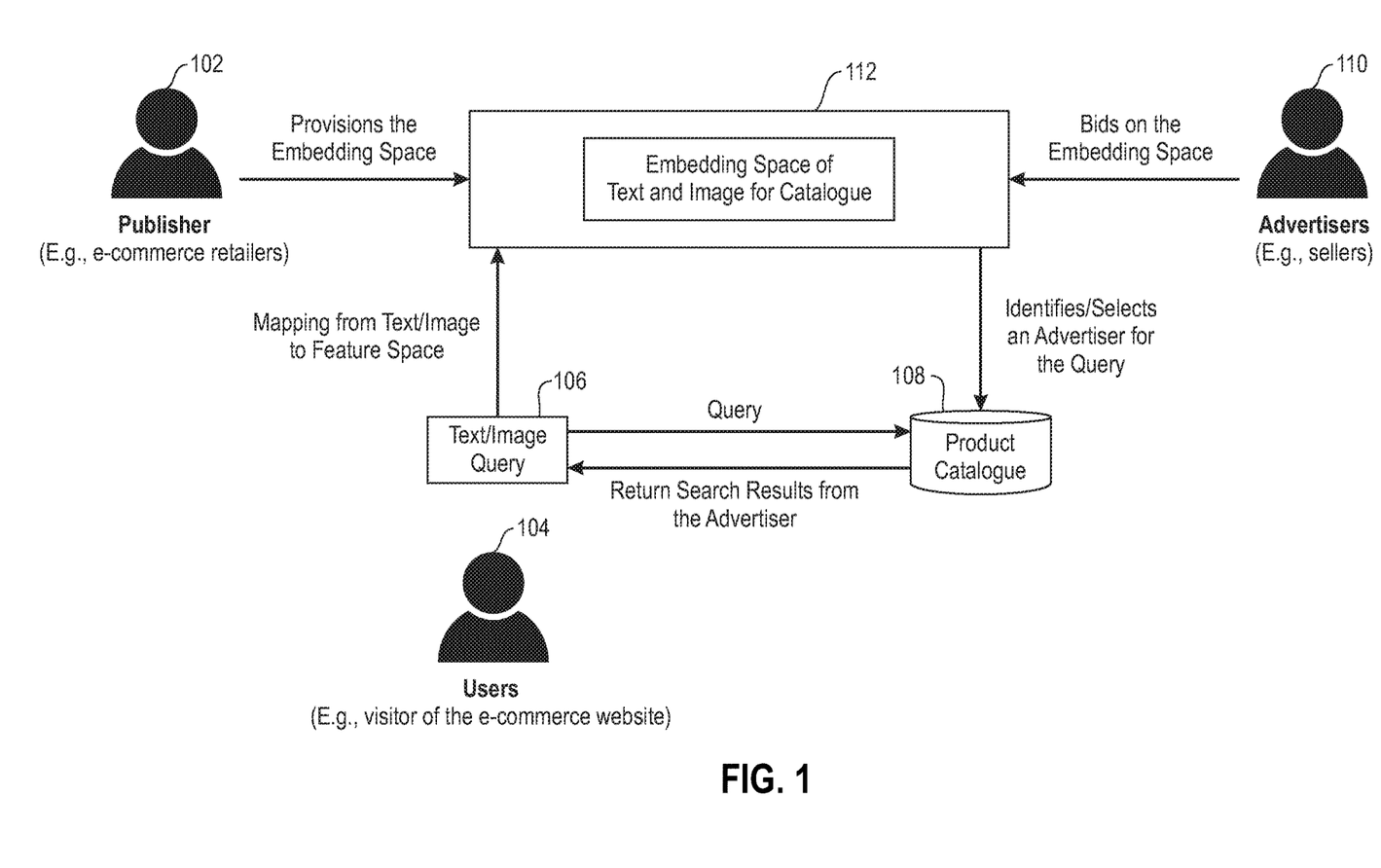
FIG. 1 is a diagram illustrating system architecture, according to an exemplary embodiment of the invention.

FIG. 1 is a diagram illustrating system architecture, according to an embodiment of the invention. By way of illustration, FIG. 1 depicts an example publisher 102, advertiser 110, and user 104 eco-system for bidding in connection with a multi-modal search. As depicted in FIG. 1, a publisher 102 (which can include, for example, e-commerce retailers) creates an embedding space 112 open to embedding. In one or more embodiments of the invention, the embedding space is created offline (using the catalog of the retailer) and stored in a server. The embedding space can then be visualized, for example, through a private link shared between the e-commerce retailer and the seller(s). Also, in such an embodiment, the embedding space 112 is an n-dimensional space for multi-modal representation of a catalogue of images and text (for example, images of the e-commerce retailer's products and text descriptions thereof). Once created (for example, via t-distributed stochastic neighbor embedding (t-SNE)), the embedding space 112 is open to bidding from advertisers 110 (such as, for example, sellers of products and/or services seeking to display and/or promote their products/services on the e-commerce retailer web site).

As also depicted in FIG. 1, advertisers 110 can submit bids for one or more portions or sub-spaces within the embedding space 112. By way of example, the bid process can be enabled by a joint text/image embedding, visualization and UI. For instance, an aggregator (that is, the e-commerce retailer) can use its entire catalog to create such a UI, and the brands within that aggregator could bid for one or more different sub-spaces of the embedding space by selecting one or more regions in this UI. By way of illustration, assume an example sub-space includes red-shirts. If an advertiser/seller bids on this sub-space, per one or more embodiments of the invention, any query which is similar to the embedding sub-space of red-shirts would lead to search results (being presented to the user submitting the query) from the advertiser/seller.

Additionally, given a text and/or image query 106 submitted by a user 104 (such as, for example, a visitor to a relevant e-commerce website), at least one embodiment of the invention includes mapping the image and/or text of the query 106 to the embedding space 112. Such mapping can be carried out, for example, using cosine similarity. Further, such an embodiment can subsequently determine an advertiser 110 (that is, an advertiser that has submitted a bid) to select for implementation in connection with the query 106. By way merely of example, one or more embodiments of the invention can include determining the advertiser to select (also referred to herein as the "best" advertiser) for the queried image and/or text 106 based on a weighted score of the similarity between the embedding of the query 106 and the revenue generated from the advertiser. In one or more embodiments of the invention, the weighted score is a function of the best matching bid and the best price bid for the same query. By way of example, if five different bids match as closest to the query, the bid having the highest bid price will be selected. Therefore, at least one embodiment of the invention can include assigning a score to every bid sub-space for a given query, and selecting the one with the best score.

As further depicted in FIG. 1, at least one embodiment of the invention includes forwarding the query 106 to a product catalogue 108 associated with the selected advertiser, and returning the results for the query 106 from the catalogue 108 to the user 106. At least one embodiment of the invention includes using the query and computing a score for every bidder. Next, after identifying the best bidder (brand) for the query, such an embodiment includes searching for the query in this brand's catalog to return the matching results.

Figure 2:
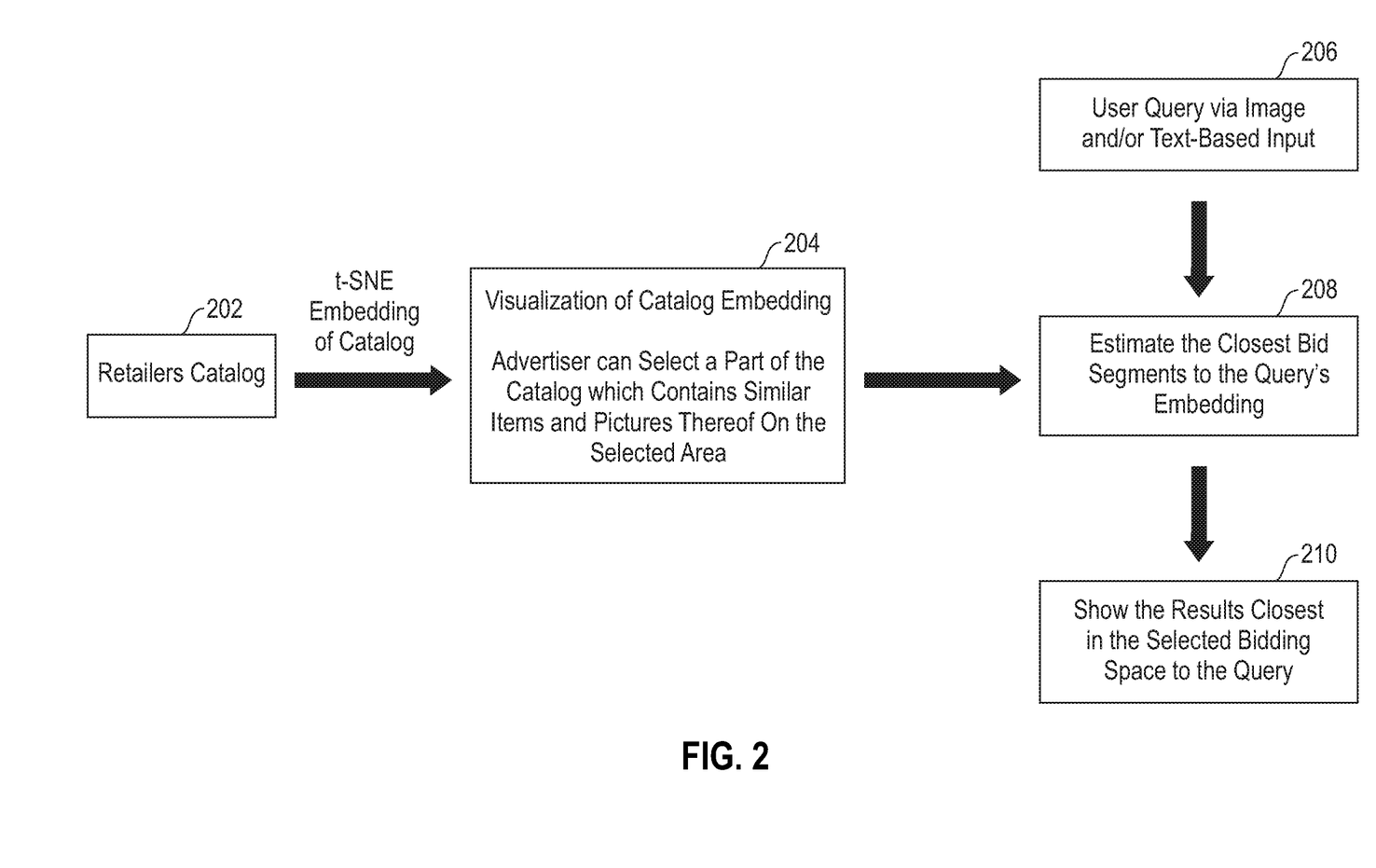
FIG. 2 is a flow diagram illustrating techniques according to an embodiment of the present invention.

FIG. 2 is a flow diagram illustrating techniques according to an embodiment of the present invention. By way of illustration, FIG. 2 depicts embedding (for example, via t-SNE) of one or more retailer produce/service catalogues 202 into an embedding space. Step 204 of FIG. 2 includes generating a visualization of the catalog embedding(s). Such a visualization can include, for example, generating a UI for display and interaction with advertisers/sellers. Using the created visualization, advertisers/sellers can selected one or more parts/portions of a catalog which contains similar items and pictures thereof. For example, a clothing advertiser/seller could select, via a UI visualization, a set of similar off-shoulder dark colored evening gowns, a set of similar leather jackets and pants pairs, etc.

As also depicted in FIG. 2, a user query 206 via image and/or text-based input is provided and/or obtained. Step 208 then includes estimating the most similar bid segments to the query's embedding, and step 210 includes outputting and/or displaying the closest and/or most similar results in the selected bidding space, with respect to the query 206. The closest bid embedding can be selected using the weighted score detailed above. As noted, the weighted score is a function of the similarity of the query with the bid space and the bid price. In order to compute the similarity of the query with the bid space, the query can be mapped into an embedding.

Figure 3:
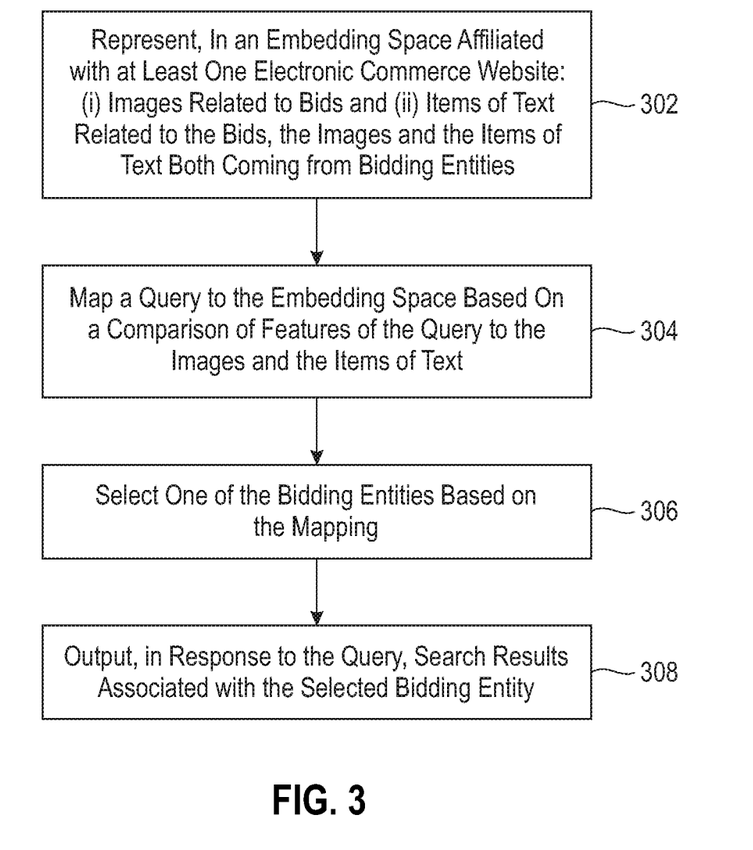
FIG. 3 is a flow diagram illustrating techniques according to an embodiment of the invention.

FIG. 3 is a flow diagram illustrating techniques according to an embodiment of the present invention. Step 302 includes representing, in an embedding space affiliated with at least one electronic commerce website: (i) one or more images related to one or more bids and (ii) one or more items of text related to the one or more bids, the one or more images and the one or more items of text both coming from one or more bidding entities. Representing can include representing, at one or more particular sub-spaces within the embedding space, and based on bid information submitted by the one or more bidding entities, (i) the one or more images related to the one or more bids and (ii) the one or more items of text related to the one or more bids. In at least one embodiment of the invention, the one or more images can include one or more images of one or more products offered for sale by the one or more bidding entities, and the one or more items of text can describe one or more products offered for sale by the one or more bidding entities.

Step 304 includes mapping a query to the embedding space based on a comparison of one or more features of the query to (i) the one or more images and (ii) the one or more items of text. The query can include an image query and/or a text query.

Step 306 includes selecting at least one of the one or more bidding entities based on said mapping. Selecting can include selecting the at least one bidding entity based on a weighted similarity score between (i) the one or more features of the query and (ii) revenue generated, for each of the one or more bidding entities.

Step 308 includes outputting, to at least one user in response to the query, search results associated with the at least one selected bidding entity. Outputting can include deriving the search results from one or more catalogues associated with the at least one selected bidding entity.

Figure 4:
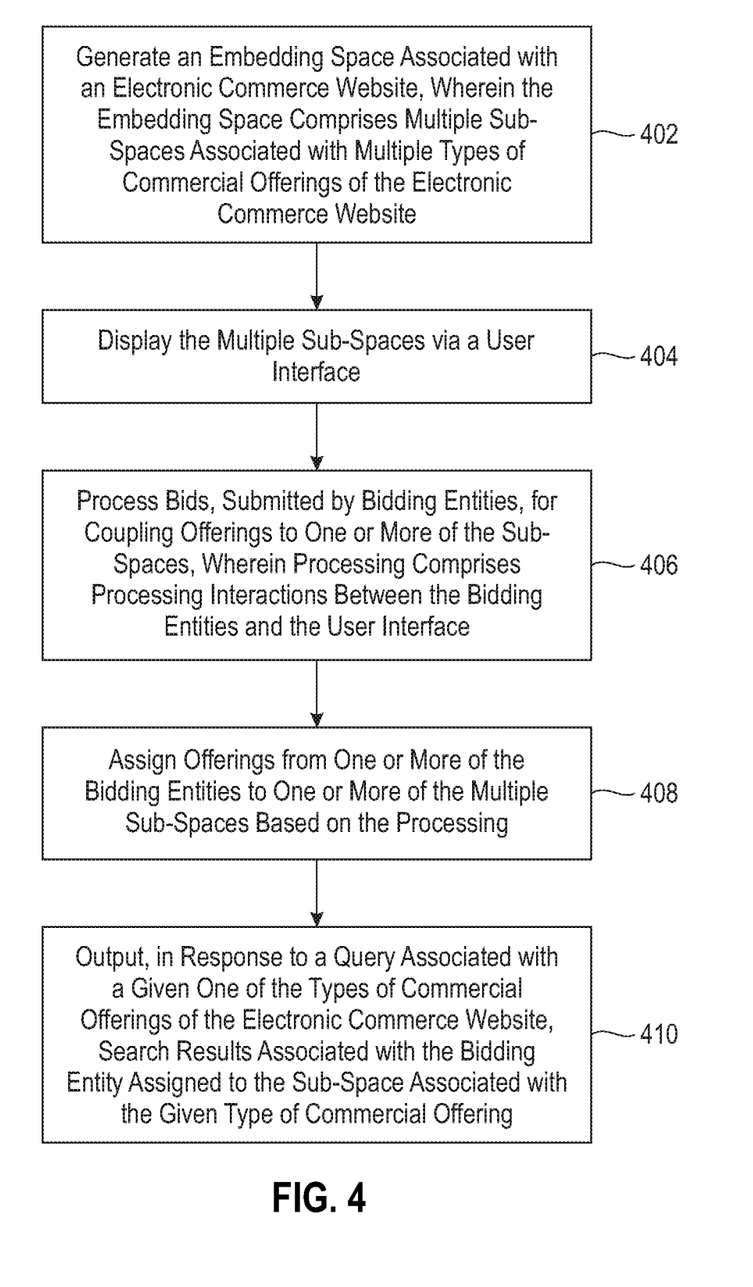
FIG. 4 is a flow diagram illustrating techniques according to an embodiment of the invention.

FIG. 4 is a flow diagram illustrating techniques according to an embodiment of the present invention. Step 402 includes generating an embedding space associated with at least one electronic commerce website, wherein the embedding space comprises multiple sub-spaces associated with multiple types of commercial offerings of the at least one electronic commerce website. Step 404 includes displaying the multiple sub-spaces via a user interface.

Step 406 includes processing one or more bids, submitted by one or more bidding entities, for coupling one or more offerings to one or more of the multiple sub-spaces, wherein said processing comprises processing one or more interactions between the one or more bidding entities and the user interface. Step 408 includes assigning one or more offerings from one or more of the bidding entities to one or more of the multiple sub-spaces based on said processing.

Step 410 includes outputting, to at least one user in response to a query associated with a given one of the multiple types of commercial offerings of the at least one electronic commerce website, search results associated with the bidding entity assigned to the sub-space associated with the given type of commercial offering. The query can include an image query and/or a text query. Additionally, outputting can include deriving the search results from one or more catalogues associated with the at least one selected bidding entity.

The techniques depicted in FIG. 3 and FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 and FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
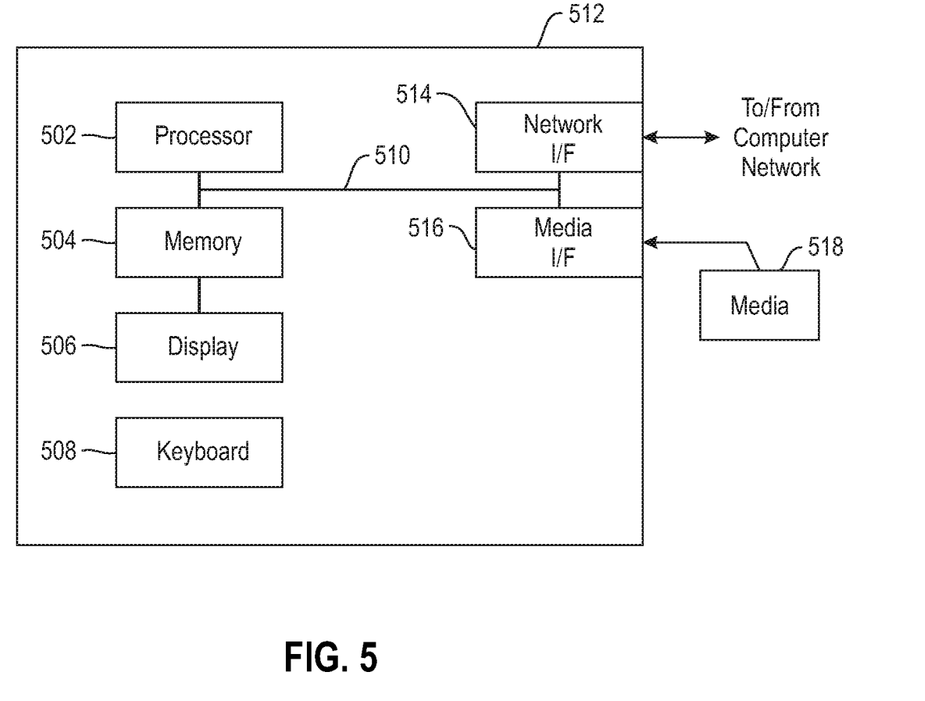
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
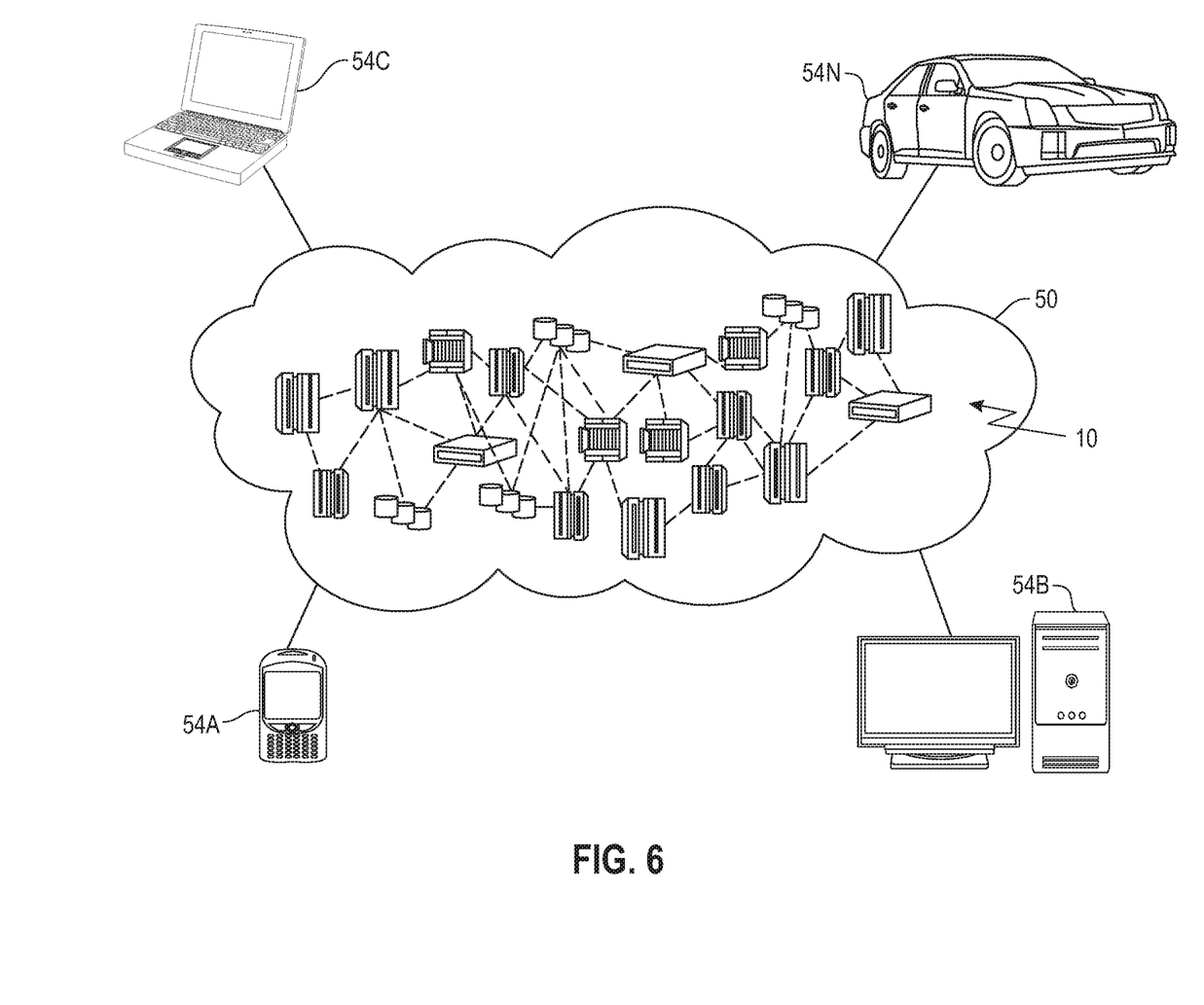
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
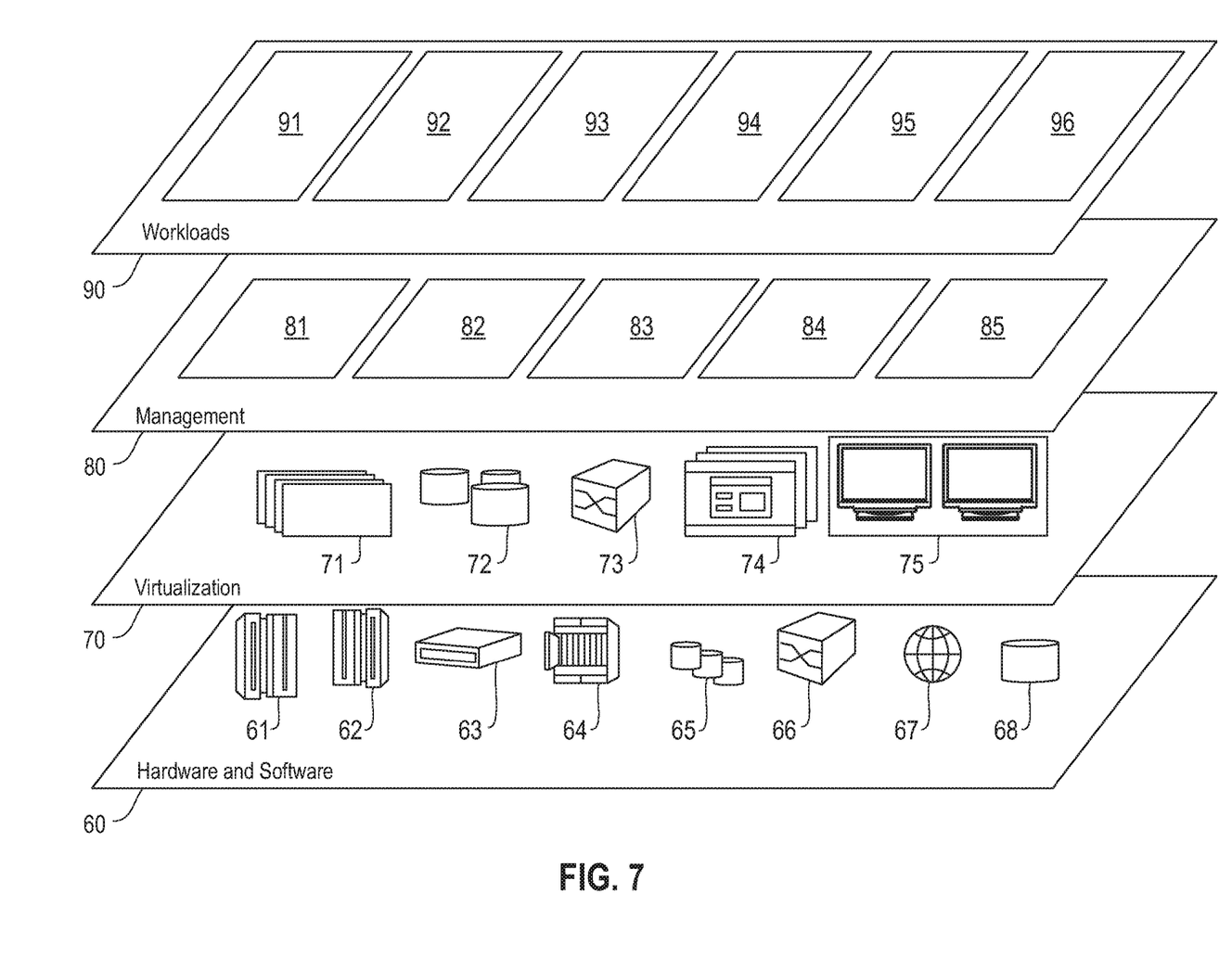
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-modal sub-space bidding 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, creating an embedding space open to embedding, for representing bid images from advertisers and/or bidders, in response to an image query.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    generating, in connection with an embedding space affiliated with at least one electronic commerce website, an interactive user interface by rendering multiple sub-spaces associated with multiple types of commercial offerings comprising text and images of the at least one electronic commerce website to multiple respective regions within the interactive user interface, wherein said generating comprises using at least one t-distributed stochastic neighbor embedding technique;
    outputting, to one or more bidding entities, the interactive user interface;
    dynamically modifying the interactive user interface, in response to inputs from at least a portion of the one or more bidding entities, by representing: (i) one or more images related to one or more bids and (ii) one or more items of text related to the one or more bids, said one or more images and said one or more items of text both coming from the at least a portion of the one or more bidding entities;
    mapping, using one or more cosine similarity algorithms, a query to the embedding space based on a comparison of one or more features of the query to (i) the one or more images and (ii) the one or more items of text, wherein the query comprises text content and image content;
    selecting at least one of the one or more bidding entities based on said mapping;
    outputting, to at least one user in response to the query, search results associated with the at least one selected bidding entity; and
    automatically training the at least one t-distributed stochastic neighbor embedding technique based at least in part on feedback comprising portions of the query and the search results;
    wherein the method is carried out by at least one computing device.

2. The computer-implemented method of claim 1, wherein said dynamically modifying comprises representing, at one or more of the multiple sub-spaces within the embedding space, and based on bid information submitted by the one or more bidding entities, (i) the one or more images related to the one or more bids and (ii) the one or more items of text related to the one or more bids.

3. The computer-implemented method of claim 1, wherein the one or more images comprise one or more images of one or more products offered for sale by the one or more bidding entities.

4. The computer-implemented method of claim 1, wherein the one or more items of text describe one or more products offered for sale by the one or more bidding entities.

5. The computer-implemented method of claim 1, wherein said selecting comprises selecting the at least one bidding entity based on a weighted similarity score between (i) the one or more features of the query and (ii) revenue generated, for each of the one or more bidding entities.

6. The computer-implemented method of claim 1, wherein said outputting comprises deriving the search results from one or more catalogues associated with the at least one selected bidding entity.

7. A computer program product comprising a computer readable storage medium having program instructions embodied therewith, the program instructions executable by a computing device to cause the computing device to:
generate, in an embedding space affiliated with at least one electronic commerce website, an interactive user interface by rendering multiple sub-spaces associated with multiple types of commercial offerings comprising text and images of the at least one electronic commerce website to multiple respective regions within the interactive user interface, wherein said generating comprises using at least one t-distributed stochastic neighbor embedding technique;
output, to one or more bidding entities, the interactive user interface;
dynamically modify the interactive user interface, in response to inputs from at least a portion of the one or more bidding entities, by representing: (i) one or more images related to one or more bids and (ii) one or more items of text related to the one or more bids, said one or more images and said one or more items of text both coming from at least a portion of the one or more bidding entities;
map, using one or more cosine similarity algorithms, a query to the embedding space based on a comparison of one or more features of the query to (i) the one or more images and (ii) the one or more items of text, wherein the query comprises text content and image content;
select at least one of the one or more bidding entities based on said mapping;
output, to at least one user in response to the query, search results associated with the at least one selected bidding entity; and
automatically train the at least one t-distributed stochastic neighbor embedding technique based at least in part on feedback comprising portions of the query and the search results.

8. The computer program product of claim 7, wherein said dynamically modifying comprises representing, at one or more of the multiple sub-spaces within the embedding space, and based on bid information submitted by the one or more bidding entities, (i) the one or more images related to the one or more bids and (ii) the one or more items of text related to the one or more bids.

9. The computer program product of claim 7, wherein the one or more images comprise one or more images of one or more products offered for sale by the one or more bidding entities, and wherein the one or more items of text comprise one or more items of text describing one or more products offered for sale by the one or more bidding entities.

10. The computer program product of claim 7, wherein said selecting comprises selecting the at least one bidding entity based on a weighted similarity score between the one or more features of the query and revenue generated from each of the one or more bidding entities.

11. The computer program product of claim 7, wherein said outputting comprises deriving the search results from one or more catalogues associated with the at least one selected bidding entity.

12. A system comprising:
a memory; and
at least one processor operably coupled to the memory and configured for:
generating, in an embedding space affiliated with at least one electronic commerce website, an interactive user interface by rendering multiple sub-spaces associated with multiple types of commercial offerings comprising text and images of the at least one electronic commerce website to multiple respective regions within the interactive user interface, wherein said generating comprises using at least one t-distributed stochastic neighbor embedding technique;
outputting, to one or more bidding entities, the interactive user interface;
dynamically modifying the interactive user interface, in response to inputs from at least a portion of the one or more bidding entities, by representing: (i) one or more images related to one or more bids and (ii) one or more items of text related to the one or more bids, said one or more images and said one or more items of text both coming from at least a portion of the one or more bidding entities;
mapping, using one or more cosine similarity algorithms, a query to the embedding space based on a comparison of one or more features of the query to (i) the one or more images and (ii) the one or more items of text, wherein the query comprises text content and image content;
selecting at least one of the one or more bidding entities based on said mapping; and
outputting, to at least one user in response to the query, search results associated with the at least one selected bidding entity; and
automatically training the at least one t-distributed stochastic neighbor embedding technique based at least in part on feedback comprising portions of the query and the search results.

13. The system of claim 12, wherein said representing comprises dynamically modifying, at one or more of the multiple sub-spaces within the embedding space, and based on bid information submitted by the one or more bidding entities, (i) the one or more images related to the one or more bids and (ii) the one or more items of text related to the one or more bids.

\* \* \* \* \*